United States Patent
Ye et al.

(10) Patent No.: US 10,178,412 B2
(45) Date of Patent: Jan. 8, 2019

(54) METHODS OF PALETTE MODE CODING IN VIDEO CODING

(71) Applicant: HFI Innovation Inc., Zhubei, Hsinchu County (TW)

(72) Inventors: Jing Ye, San Jose, CA (US); Jungsun Kim, San Jose, CA (US); Shan Liu, San Jose, CA (US); Wang-Lin Lai, San Jose, CA (US); Tzu-Der Chuang, Zhubei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 15/563,811

(22) PCT Filed: Apr. 8, 2016

(86) PCT No.: PCT/CN2016/078824
§ 371 (c)(1),
(2) Date: Oct. 2, 2017

(87) PCT Pub. No.: WO2016/161967
PCT Pub. Date: Oct. 13, 2016

(65) Prior Publication Data
US 2018/0098093 A1    Apr. 5, 2018

Related U.S. Application Data

(60) Provisional application No. 62/182,690, filed on Jun. 22, 2015, provisional application No. 62/173,030, (Continued)

(51) Int. Cl.
H04N 19/70     (2014.01)
H04N 19/176    (2014.01)
H04N 19/186    (2014.01)

(52) U.S. Cl.
CPC ........... H04N 19/70 (2014.11); H04N 19/176 (2014.11); H04N 19/186 (2014.11)

(58) Field of Classification Search
CPC ..... H04N 19/186; H04N 19/176; H04N 19/70
(Continued)

(56) References Cited

U.S. PATENT DOCUMENTS

2003/0076993 A1* 4/2003 Li ........................... G06T 9/005
                                                                382/166
2007/0223579 A1   9/2007 Bao
(Continued)

FOREIGN PATENT DOCUMENTS

WO    WO 2014/165784 A1    10/2014

OTHER PUBLICATIONS

International Search Report dated Jul. 6, 2016, issued in application No. PCT/CN2016/078824.
(Continued)

*Primary Examiner* — On S Mung
(74) *Attorney, Agent, or Firm* — McClure, Qualey & Rodack, LLP

(57) ABSTRACT

A simplified syntax signalling for the number of palette indices is disclosed, where the syntax element corresponding to the total number of palette indices minus one is signalled and the palette indices are associated with the copy-index modes in the current block. In another embodiment, a syntax corresponding to the number of palette indices minus 1 is signalled, where the palette indices are associated with the copy-index modes in the current block. According to this embodiment, the syntax is constrained to a range from 0 to block size minus 1. In yet another embodiment, conformance constraint is imposed on the palette predictor run. For a current position of the palette predictor list, a syntax element corresponding to a current
(Continued)

palette predictor run is parsed from the input bitstream and the syntax element is constrained to a range of values access valid entries in the palette predictor.

20 Claims, 4 Drawing Sheets

Related U.S. Application Data filed on Jun. 9, 2015, provisional application No. 62/144,529, filed on Apr. 8, 2015.

(58) Field of Classification Search
USPC .................................................. 375/240.02
See application file for complete search history.

(56) References Cited

U.S. PATENT DOCUMENTS

| | | | |
|---|---|---|---|
| 2014/0140400 A1 | 5/2014 | George et al. | |
| 2014/0301474 A1* | 10/2014 | Guo | H04N 19/50 375/240.24 |
| 2015/0010053 A1* | 1/2015 | Xu | H04N 19/105 375/240.02 |

OTHER PUBLICATIONS

Guo, et al.; "RCE3: Results of Test 3.1 on Palette Mode for Screen Content Coding;" Joint Collaborative Team on Video Coding (JCT-VC) of ITU-T SG 16 WP 3 and ISO/IEC JTC 1/SC 29/WG 11; 14th Meeting; Vienna, AT; Jul.-Aug. 2013; pp. 1-7.

Joshi, R., et al.; "High Efficiency Video Coding (HEVC) Screen Content Coding Draft 3;" Joint Collaborative Team on Video Coding (JCT-VC) of ITU-T SG 16 WP 3 and ISO/IEC JTC 1/SC 29/WG 11; 20th Meeting; Geneva, CH; Feb. 2015; p. 1-567.

Pu, W., et al.; "SCCE3: Test B.12—Binarization of Escape Sample and Palette Index;" Joint Collaborative Team on Video Coding (JCT-VC) of ITU-T SG 16 WP 3 and ISO/IEC JTC 1/SC 29/WG 11; 18th Meeting; Sapporo, JP; Jun.-Jul. 2014; pp. 1-3.

Karczewicz, M., et al.; "Non CE1 Grouping Palette Indices At Front" Joint Collaborative Team on Video Coding (JCT-VC) of ITU-T SG 16 WP and ISO/IEC JTC 1/SC 29/WG 11; Feb. 2015; pp. 1-3.

* cited by examiner

METHODS OF PALETTE MODE CODING IN VIDEO CODING

CROSS REFERENCE TO RELATED APPLICATIONS

The present invention claims priority to U.S. Provisional Patent Application, Ser. No. 62/144,529, filed on Apr. 8, 2015, U.S. Provisional Patent Application, Ser. No. 62/173,030, filed on Jun. 9, 2015, and U.S. Provisional Patent Application, Ser. No. 62/182,690, filed on Jun. 22, 2015. The U.S. Provisional Patent Applications are hereby incorporated by reference in their entireties.

FIELD OF THE INVENTION

The present invention relates to palette coding for video data. In particular, the present invention relates to various techniques for signalling, binarization and constraints of syntax elements associated with palette coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). In recent HEVC development, palette-based coding is being used for screen content coding (SCC). The syntaxes for palette coding mainly consist of two parts. One is signalling palette table and the other is signalling the index map of the block (i.e., a CU) which represents the information of the block coded. For the index map, number of indices, last run_type flag and grouped indices are signalled. After signalling index information, a pair of run type and number of run is repeatedly signalled. At last, group of escape values is signalled, if necessary.

In HEVC document JCTVC-T1005 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, C H, 10-18 Feb. 2015, Document: JCTVC-T1005), the palette indices are grouped and signalled in the front of the coded data for a corresponding block (i.e., before palette_run_mode and palette_run syntax elements in a bitstream for the current block). On the other hand, the escape pixels are coded at the end of the coded data for the corresponding block. The syntax elements, palette_run_mode and palette_run are coded between palette indices and escape pixels. FIG. 1 illustrates an exemplary flowchart for index map syntax signalling according to JCTVC-T1005. The number of indices (110), last run_type flag (130) and grouped indices (120) are signalled. After signalling index information, a pair of run_type (140) and number of runs (150) is repeatedly signalled. At last, a group of escape values (160) is signalled, if necessary.

In JCTVC-T1005, the last_palette_run_type_flag uses its own context to code. The context table is shown in Table 1, where initial values (i.e., initValue) for palette_run_type_flag and last_palette_run_type_flag are specified.

TABLE 1

| Initialization | ctxIdx of palette_run_type_flag and last_palette_run_type_flag | | |
|---|---|---|---|
| variable | 0 | 1 | 2 |
| initValue | 154 | 154 | 154 |

Furthermore, palette_run_type and last_palette_run_type, each having one context (ctxIdx=0), are specified in the following table.

TABLE 2

| | binIdx | | | | | |
|---|---|---|---|---|---|---|
| Syntax element | 0 | 1 | 2 | 3 | 4 | >=5 |
| ... | ... | ... | ... | ... | ... | ... |
| palette_transpose_flag | 0 | na | na | na | na | na |
| num_palette_indices_idc | bypass | bypass | bypass | bypass | bypass | bypass |
| last_palette_run_type_flag | 0 | na | na | na | na | na |
| palette_run_type_flag | 0 | na | na | na | na | na |
| palette_index_idc | bypass | bypass | bypass | bypass | bypass | bypass |

The syntaxes for palette coding mainly consist of two parts. One is signalling palette table itself and the other is signalling the index map of the block, which represents the information of the block coded. For the index map, number of indices, last run type flag and grouped indices are signalled. After signalling index information, a pair of run type and number of run is repeatedly signalled. At last, a group of escape values is signalled, if necessary. The palette index map syntax signalling in SCM4.0 can be depicted as below:

In JCTVC-T1005, the difference between NumPaletteIndices and MaxPaletteIndex is signalled, where MaxPaletteIndex specifies the maximum possible value for a palette index of the current coding unit. The value of MaxPaletteIndex is set equal to CurrentPaletteSize−1+palette_escape_val_present_flag. The corresponding syntax element for the number of indices is num_palette_indices_idc. The corresponding syntax is as follows: num_palette_indices_idc is an indication of the number of palette indices signalled for the current block.

When num_palette_indices_idc is not present, it is inferred to be equal to 0. The variable NumPaletteIndices specifies the number of palette indices signalled for the current block and is derived as shown in the following table.

TABLE 3

```
if( num_palette_indices_idc >= ( MaxPaletteIndex - 1) * 32)
   NumPaletteIndices = num_palette_indices_idc + 1
else if(num_palette_indices_idc % 32 = = 31)
   NumPaletteIndices = MaxPaletteIndex - (num_palette_indices_idc + 1) / 32 -1)
else
   NumPaletteIndices = ( num_palette_indices_idc / 32 ) * 31) +
      (num_palette_indices_idc % 32) + MaxPaletteIndex
```

In JCTVC-T1005, it also discloses a method to signal the palette table of the current block based on a palette predictor. FIG. 2 illustrates an example of the process of reconstructing the palette for the current block based on a palette predictor as specified in JCTVC-T1005. Some entries of the palette predictor 220 are reused by the palette of the current block 210. The correspondences between the reused entries of the palette predictor 220 and reused entries of the palette of the current block are indicated by arrows 215. Palette reuse flags 230 are used to identify the entries of the palette predictor that are reused. If the palette reuse flag is equal to 1, it indicates that the corresponding entry is reused. If the palette reuse flag is equal to 0, it indicates that the corresponding entry is not reused. The palette reuse flags are coded by run-length coding, where the runs of "1" s are coded as syntax element palette_predictor_run.

BRIEF SUMMARY OF THE INVENTION

Various methods for signalling, binarization and constraints of syntax elements associated with palette coding are disclosed. In one embodiment, a simplified syntax signalling for the number of palette indices is disclosed, where the syntax element corresponding to (the total number of palette indices−1), (the total number of palette indices−2), or (the total number of palette indices−2+the number of escape pixels), is signalled and the palette indices are associated with the copy-index modes in the current block. The syntax element can be binarized using N-th order exponential Golomb (EG) code and N is a non-negative integer. The N can be selected adaptively according to block size. The syntax element can also be binarized into a prefix part corresponds to MSB (most significant bits) and a suffix part of the syntax element. The prefix part can be coded by context-based entropy coding.

In another embodiment, a syntax corresponding to the number of palette indices minus 1 is signalled, where the palette indices are associated with the copy-index modes in the current block. According to this embodiment, the syntax is constrained to a range from 0 to block size minus 1.

In yet another embodiment, conformance constraint is imposed on the palette predictor run. According to this embodiment, for a current position of the palette predictor list, a syntax element corresponding to a current palette predictor run is parsed from the input bitstream and the syntax element is constrained to a range of values to cause (the current palette predictor run+1) consecutive palette entries of the palette predictor list to be within the palette predictor list, where (the current palette predictor run+1) consecutive palette entries of the palette predictor list are located according to position information including the syntax element. (The current palette predictor run+1) consecutive palette entries of current palette are generated based on (the current palette predictor run+1) consecutive palette entries of the palette predictor list located according to the position information including the syntax element.

In yet another embodiment, a syntax element is signalled, where the syntax element corresponds to a total number of palette indices associated with one or more copy-index modes in the current block subtracted by a total number of entries of the current palette, and further subtracted by a non-negative integer N. The sign part and the absolute value part of the syntax element in a bitstream for the current block are signalled.

In yet another embodiment, if the total number of palette indices associated with one or more copy-index modes in the current block is greater than or equal to the total number of entries of the current palette plus N (from 0 to size of the current block), mapping a syntax element to the total number of palette indices minus the total number of entries of the current palette and minus plus N. Otherwise, mapping the syntax element to a different representation. For example, when N is 0, the different represent may correspond to the current block size minus the total number of palette indices. In other examples, the syntax element may be mapped to a large number.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Number of Palette Indices Coding

Figure 1:
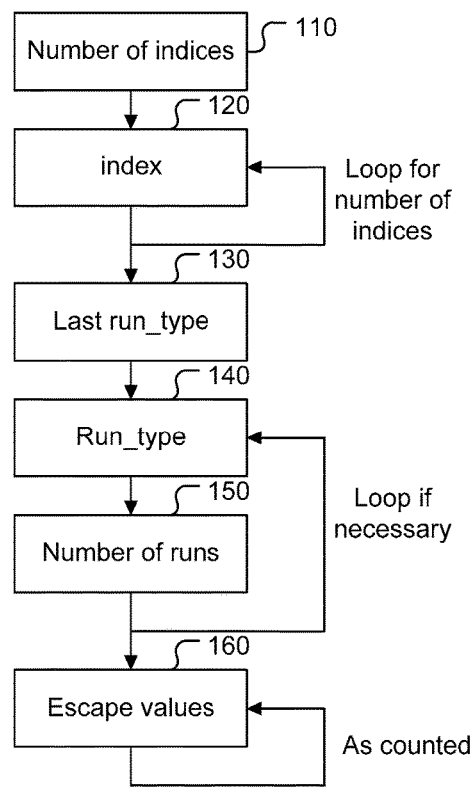
FIG. 1 illustrates an exemplary palette index map syntax signalling according to HEVC (High Efficiency Video Coding) based Screen Content Coding Test Module Version 4 (SCM-4.0).
Figure 2:
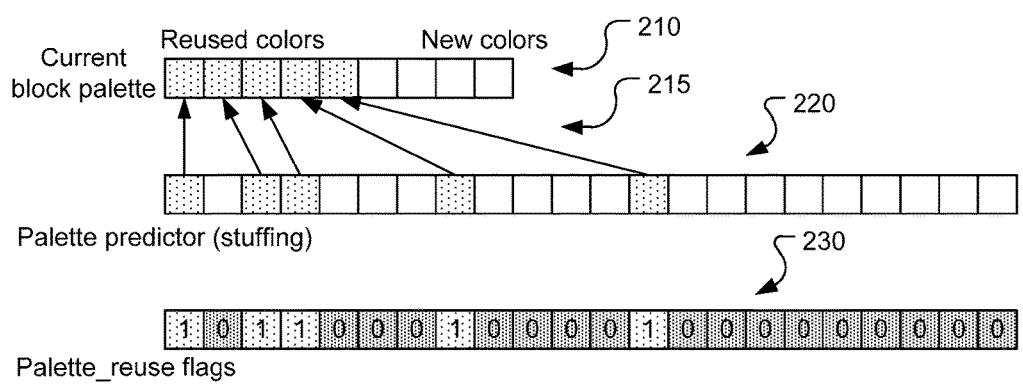
FIG. 2 illustrates an example of the process of reconstructing the palette for the current block based on a palette predictor as specified in JCTVC-T1005.

As mentioned earlier, the palette indices associated the copy-index modes of a current block have to be signalled. The palette indices associated with the copy-index modes may be grouped and signalled together. As shown in FIG. 1, the total number for the palette indices associated with the copy-index modes of the current block has to be signalled before the individual palette index values are signalled. In the following, coding techniques for signalling the total number of palette indices associated with the copy-index modes as well as the individual palette index values are addressed. The total number of palette indices is also referred as the number of indices for convenience.

Coding (Number of Indices−1)

In the existing HEVC (High Efficiency Video Coding), the number of indices coding is fairly complicated. An embodiment of the present invention signals (number of indices−1) directly. When (the palette size of current block+escape_present_flag) is greater than 1, the number of indices is always a positive value since there should be more than or equal to 1 index in a block. Syntax element escape_present_flag equal to 1 specifies that there is at least one escape pixel in the current block and escape_present_flag equal to 0 specifies that there is no escape pixel in the current block. Therefore, in a first set of embodiments, the coded number of indices is associated with the actual number of indices. In particular, (number of indices−1) is coded. After decoding, the value is reconstructed by adding 1. The number of indices is also referred as variable NumPaletteIndices in some HEVC documents. In this case, (NumPaletteIndices−1) is coded.

The coded number of indices can be binarized using various binarization processes. For example, it can be binarized using N-th order exponential Golomb (EG) code, where N can be 0 to 6 or 0 to 10 depending on the current block size. The following table illustrates an example of 0-th order exponential Golomb code, where "x" can be either "0" or "1".

TABLE 4

| Values | Binarization |
|--------|--------------|
| 0      | 1            |
| 1, 2   | 01x          |
| 3-6    | 001xx        |
| 7-14   | 0001xx       |

In another embodiment, contexts up to M bins of the binarized number of indices can be used. For example, if 3 contexts are used, the first bin for value 0, the first 2 bins for value 1 and value 2, and the first 3 bins for value 3 to 6 can use their respective contexts.

Also, it can be binarized using the same method for binarizing the number of runs, where the number of runs is binarized into a prefix part corresponding to MSB (most significant bits) of the number of runs and a remaining part of the number of runs. The table below shows an example of binarization process according to an embodiment of the present invention. For the remaining part, "x" indicates "0" or "1" and bin number is decided by truncated binarization depending on total block size and decoded number of runs. For the MSB part, up to 5 bins can use the context model.

TABLE 5

| values | Binarization | |
|--------|------|-----------|
|        | MSB  | Remaining |
| 0      | 0    |           |
| 1      | 10   |           |
| 2, 3   | 110  | x         |
| 4, 5, 6, 7 | 1110 | xx    |
| 8-15   | 11110 | xx       |
| ...    | ...  | ...       |

The same binarization process can be applied to signal the number of indices with a maximum value equal to the number of pixels in a block.

In another embodiment, the maximum value for the binarization process of the number of indices can be set to (block size−1) since there should be more than one copy_index existing in a block when (palette size+escape_present_flag) is greater than 1.

In one embodiment, the context up to M bins of the binarized number of indices can be used. For example, if 3 contexts are used, the first bin for value 0, the first 2 bins for value 1 and value 2, and the first 3 bins for value 3 to 6 can use their respective contexts.

In another embodiment, when palette_escape_val_present_flag is equal to 0, the value of (number of indices−2) is coded as the coded number of indices using the above binarization table.

In another embodiment, the value of (number of indices−2+palette_escape_val_present_flag) is coded as the coded number of indices using the above binarization table.

In another embodiment, the value of (number of indices−number of palette−N) is coded as the coded number of indices using the current mapping process and the binarization of (number of indices−number of palette) in the SCM 4.0. N is an integer from 1 to the block size.

In another embodiment, the current binarization process used to code (number of indices−palette size) is according to the "xWriteCoefRemainExGolomb" with Rice parameter cParam equal to (2+indexMax/6), where "xWriteCoefRemainExGolomb" is a functional call in the HEVC Test Model version 4.0 software for binarizing the syntax element using truncated Rice code with a Rice parameter. The current binarization process can be used to code (number of indices−1), (number of indices−2), (number of indices−2+palette_escape_val_present_flag), or (number of indices−number of palette−N). cParam can be any number. The parameter indexMax is also referred as MaxPaletteIndex in different documents.

The block size mentioned above corresponds to the size of the current CU. The number of palette entries can be derived according to equation (2):

$$\text{number of palette entries} = \text{palette size of current block} + \text{escape\_present\_flag}. \quad (2)$$

In another embodiment, the (NumPaletteIndices−1) is directly coded using the HEVC coefficient coding method with cRiceParam=2+MaxPaletteIndex/6 (i.e., using xWriteCoefRemainExGolomb( ) in SCM4.0 directly). Therefore, num_palette_indices_idc=(NumPaletteIndices−1) signalled. The syntax and semantic according to SCM-4.0 shown in Table 3 can be simply replaced by:

NumPaletteIndices=num_palette_indices_idc++.

Coding (Number of Indices−Palette Size)

In order to simplify the process of signalling number of indices associated with the copy-index modes, a set of embodiments of the present invention signal (number of indices−palette size), instead of number of indices or coded number of indices. Since it cannot be guaranteed that (number of indices−palette size) is always equal to or greater than 0, a value is negative or not may have to be signalled. For example, one flag indicating the sign can be signalled. Also, the absolute value of (number of indices−palette size) is signalled. One context can be used for the flag indicating the sign. Same binarization and contexts used for above cases for coding (number of indices−1) can be applied to coding of the absolute value of (number of indices−palette size).

In SCM-4.0, syntax element NumPaletteIndices represents the number of indices and syntax element MaxPaletteIndex specifies the maximum possible value for a palette index for the current coding unit as mentioned before. Also, the value of MaxPaletteIndex is set equal to CurrentPaletteSize−1+palette_escape_val_present_flag. Therefore, coding (number of indices−palette size) becomes coding (NumPaletteIndices−MaxPaletteIndex). When, syntax element num_palette_indices_idc is coded using (NumPaletteIndi- (number of indices−palette size) is 0 or negative. For example, in the case of the number of indices and the palette size both being 3, the coded number of indices is 0 and the difference 0 are signalled. Since the palette size for the current block can be determined, the number of indices can be derived from the difference and the palette size. In the case of the total number of indices being 3 and palette size being 5, the coded number of indices is 0 and the difference 2 is signalled. In the case of the total number of indices being 7 and the palette size being 5, if the coded number of indices is not 0, only 2 is coded for the number of indices. The difference can be coded with one or more contexts.

In another embodiment, if the number of indices is smaller than the palette size, the value of palette index is set as the palette size and (palette size−number of indices) dummy information is signalled. The number of runs for each run type is also signalled without signalling last_run_type_flag. Also, signalling the last number of run is not skipped. The syntax table below shows the changes that have to be made, where texts enclosed by an asterisk pair within a bracket pair (i.e., [*deleted text*]) indicate deletion.

TABLE 6

```
palette_coding( x0, y0, nCbS ) {
  ...
  if( MaxPaletteIndex > 0 ) {
    palette_transpose_flag
    num_palette_indices_idc
    for( i=0; i < NumPaletteIndices; i++)
    {
      palette_index_idc
      PaletteIndexIdc[ i ] = palette_index_idc
    }
    [*last_palette_run_type_flag*]
  }
  .....
    if( MaxPaletteIndex > 0 && CurrNumIndices < NumPaletteIndices ) {
      if( PaletteScanPos >= nCbS && palette_run_typeflag[ xcPrev ][ ycPrev ]
          != COPY_ABOVE_MODE && PaletteScanPos < nCbS * nCbS − 1) {
        palette_run_type_flag[ xC ][ yC ]
      }
      readIndex = 0
      if( palette_run_type_flag[ xC ][ yC ] = = COPY_INDEX_MODE &&
        AdjustedMaxPaletteIndex > 0)
        readIndex = 1
      maxPaletteRun = nCbS * nCbS − PaletteScanPos − 1
      if( AdjustedMaxPaletteIndex > 0 [*&&
        ( ( CurrNumIndices + readIndex ) < NumPaletteIndices | |
        palette_run_type_flag[ xC ][ yC ] != last_palette_run_type_flag ) )*]
        if( maxPaletteRun > 0 ) {
          palette_run_msb_id_plus1
          if( palette_run_msb_id_plus1 > 1 )
            palette_run_refinement_bits
        }
      CurrNumIndices + = readIndex
    }
    runPos = 0
  }
}
``` ces−MaxPaletteIndex) (i.e., num_palette_indices_idc= (NumPaletteIndices−MaxPaletteIndex)), its values may become zero or negative. In another embodiment, (NumPaletteIndices−MaxPaletteIndex−N) is coded, where N is a non-negative integer. In order to deal with the case that num_palette_indices_idc may be positive, zero or negative, a flag to indicate the sign is signalled along with the absolute value of num_palette_indices_idc. One context can be used for the flag indicating the sign.

In another embodiment, a coded number 0 for (number of indices−palette size) and the difference between the total number of indices and the palette size are signalled if In another embodiment, if (value of palette index−number of palette) is smaller than 0, then (value of palette index−number of palette) is mapped as shown in the following table. The number of palette is also referred as palette size in this disclosure.

TABLE 7 if (number of indices − number of palette) <0
    mapping (number of indices − number of palette)
        to (block size − number of indices), TABLE 7-continued

```
    which is uiMappedValue =( block size −
    number of indices)
    if (number of indices − number of palette) >=0
        coding (number of indices − number of palette)
        which is uiMappedValue= number of indices −
        number of palette.
```

In the above table, uiMappedValue corresponds to a syntax element to be signalled in the bitstream.

Syntax elements NumPaletteIndices and MaxPaletteIndex can be used in the above Table to replace (number of indices) and (number of palette) respectively. The block size can be the size of the current coding unit (CU) or prediction unit (PU). The syntax and semantic according to JCTVC-T1005 shown in Table 3 can be simply replaced by the process in the following table.

TABLE 8

```
    if ( num_palette_indices_idc > uiTotal −
    ( MaxPaletteIndex) )
        NumPaletteIndices = uiTotal −
        num_palette_indices_idc;
    else
        NumPaletteIndices = num_palette_indices_idc +
        ( MaxPaletteIndex );
```

In the above table, uiTotal corresponds to block size.

According to one embodiment, the value of NumPaletteIndices should be constrained to a range from 1 to PaletteCodedArea, which corresponds to the block size.

According to another embodiment, the value of num_palette_indices_idc should be constrained to a range from 0 to PaletteCodedArea−1.

For example, the PaletteCodedArea can be nCbS*nCbS. If L rows or columns of a palette mode CU are predicted from the neighbouring CU or other methods, the PaletteCodedArea can be nCbS*(nCbS−L).

In another embodiment, when num_palette_indices_idc= (NumPaletteIndices−MaxPaletteIndex) has a negative value, num_palette_indices_idc is mapped to a big value, such as max(uiTotal, palette_max_size)−NumPaletteIndices. One example of semantics is shown in the following table. As mentioned before, uiTotal corresponds to block size in this disclosure.

TABLE 9

```
    if ( num_palette_indices_idc >
    max(uiTotal, palette_max_size) −
        (MaxPaletteIndex) )
        NumPaletteIndices = max(uiTotal, palette_max_size) −
        num_palette_indices_idc;
    else
        NumPaletteIndices = num_palette_indices_idc +
        ( MaxPaletteIndex );
```

In another embodiment, the negative num_palette_indices_idc (i.e., (NumPaletteIndices−MaxPaletteIndex)) is mapped to a big value, such as max(uiTotal, palette_max_size)+NumPaletteIndices. An exemplary semantics is as in the following table.

TABLE 10

```
    if ( num_palette_indices_idc >
    max(uiTotal, palette_max_size) +
        (MaxPaletteIndex) )
```

TABLE 10-continued

```
        NumPaletteIndices = num_palette_indices_idc −
        max(uiTotal, palette_max_size);
    else
        NumPaletteIndices = num_palette_indices_idc +
        ( MaxPaletteIndex );
```

In another embodiment, the negative num_palette_indices_idc (i.e., (NumPaletteIndices−MaxPaletteIndex)) is mapped to a big value, such as uiTotal+NumPaletteIndices. An exemplary semantics is as in the following table.

TABLE 11

```
    if ( num_palette_indices_idc > uiTotal+
    ( MaxPaletteIndex) )
        NumPaletteIndices = num_palette_indices_idc − uiTotal;
    else
        NumPaletteIndices = num_palette_indices_idc +
        ( MaxPaletteIndex );
```

An alternative semantics to the above Table is shown in the following table.

TABLE 12

```
    if ( num_palette_indices_idc > M+
    ( MaxPaletteIndex) )
        NumPaletteIndices = num_palette_indices_idc − M;
    else
        NumPaletteIndices = num_palette_indices_idc +
        ( MaxPaletteIndex );
```

In the above case, M is a predefined big number greater than uiTotal so that (M+MaxPaletteIndex) is greater than (NumPaletteIndices−MaxPaletteIndex).

In another embodiment, num_palette_indices_idc is coded as (NumPaletteIndices−MaxPaletteIndex−N), where N any integer from 0 to block size.

When num_palette_indices_idc is coded as (NumPaletteIndices−MaxPaletteIndex−N), it cannot be guaranteed that its value is always equal to or greater than 0. In this case, the following mapping methods can be applied.

In one embodiment, a negative number is mapped to a relative big value. An exemplary semantics for N equal to 1 is shown in the following table.

TABLE 13

```
    if ( num_palette_indices_idc > uiTotal −
    ( MaxPaletteIndex+1) )
        NumPaletteIndices = uiTotal − num_palette_indices_idc;
    else
        NumPaletteIndices = num_palette_indices_idc +
        ( MaxPaletteIndex+1 );
```

In another embodiment, a negative num_palette_indices_idc corresponding to (NumPaletteIndices−MaxPaletteIndex−N) is mapped to a big value, such as max(uiTotal, palette_max_size)−NumPaletteIndices. An exemplary semantics for N equal to 1 is shown in the following table.

TABLE 14

```
if ( num_palette_indices_idc > max(uiTotal, palette_max_size) −
    ( MaxPaletteIndex+1) )
    NumPaletteIndices = max(uiTotal, palette_max_size) −
    num_palette_indices_idc;
```

TABLE 14-continued

```
else
    NumPaletteIndices = num_palette_indices_idc +
    ( MaxPaletteIndex+1 );
```

In another embodiment, a negative num_palette_indices_idc corresponding to (NumPaletteIndices−MaxPaletteIndex−N) is mapped to a big value, such as max(uiTotal, palette_max_size)+NumPaletteIndices. An exemplary semantics for N equal to 1 is shown in the following table.

TABLE 15

```
if ( num_palette_indices_idc > max(uiTotal, palette_max_size) +
        ( MaxPaletteIndex+1) )
    NumPaletteIndices = num_palette_indices_idc −
        max(uiTotal, palette_max_size);
else
    NumPaletteIndices = num_palette_indices_idc +
        ( MaxPaletteIndex+1 );
```

In another embodiment, a negative num_palette_indices_idc corresponding to (NumPaletteIndices−MaxPaletteIndex−N) is mapped to a big value, such as uiTotal+NumPaletteIndices. An exemplary semantics for N equal to 1 is shown in the following table.

TABLE 16

```
if ( num_palette_indices_idc > uiTotal+ ( MaxPaletteIndex+1) )
    NumPaletteIndices = num_palette_indices_idc − uiTotal;
else
    NumPaletteIndices = num_palette_indices_idc +
        ( MaxPaletteIndex+1 );
```

In another embodiment, a negative num_palette_indices_idc corresponding to (NumPaletteIndices−MaxPaletteIndex−N) is mapped to a big value, such as uiTotal+NumPaletteIndices. An exemplary semantics for N equal to 1 is shown in the following table.

TABLE 17

```
if ( num_palette_indices_idc > M + ( MaxPaletteIndex+1) )
    NumPaletteIndices = num_palette_indices_idc − M;
else
    NumPaletteIndices = num_palette_indices_idc +
        ( MaxPaletteIndex+1 );
```

In the above example, M is a big number greater than uiTotal so that (M+MaxPaletteIndex) is larger than (NumPaletteIndices−N+MaxPaletteIndex). In the above example, uiTotal can be equal to nCbSw*nCbSh, where nCbSw is the width of the current block and nCbSh is the height of the current block.

In another embodiment, a sign flag is used to code the sign of num_palette_indices_idc corresponding to (NumPaletteIndices−MaxPaletteIndex−N) and its absolute value follows. The sign flag can be CABAC context coded or CABAC bypass coded.

When the value range of num_palette_indices_idc corresponding to (NumPaletteIndices−MaxPaletteIndex) is always equal to or greater than 0, num_palette_indices_idc can be coded directly without mapping. An exemplary semantics for N equal to 1 is shown in the following table, where the semantics in Table 3 is replaced by the following statement:

NumPaletteIndices=num_palette_indices_*idc*+(MaxPaletteIndex).

In another embodiment, when the value range of num_palette_indices_idc corresponding to (NumPaletteIndices−MaxPaletteIndex−1) is always equal to or greater than 0, num_palette_indices_idc can be coded directly without mapping. An exemplary semantics for N equal to 1 is shown in the following table, where the semantics in Table 3 is replaced by the following statement:

NumPaletteIndices=num_palette_indices_*idc*+(MaxPaletteIndex+1).

In another embodiment, when the value range of num_palette_indices_idc corresponding to (NumPaletteIndices−MaxPaletteIndex−N) is always equal to or greater than 0, num_palette_indices_idc can be coded directly without mapping. An exemplary semantics for N equal to 1 is shown in the following table, where the semantics in Table 3 is replaced by the following statement:

NumPaletteIndices=num_palette_indices_*idc*+(MaxPaletteIndex+*N*).

In another embodiment, the mapping can follow the specification in the current SCM4.0. However, the syntax can be different. The variable NumPaletteIndices specifies the number of palette indices signalled for the current block and is derived as shown in the following Table.

TABLE 18

```
if( num_palette_indices_idc >= ( MaxPaletteIndex ) * 32 )
    NumPaletteIndices = num_palette_indices_idc + 1;
else if(num_palette_indices_idc % 32 = = 31)
    NumPaletteIndices = MaxPaletteIndex + 1 −
        (num_palette_indices_idc + 1) / 32 ;
else
    NumPaletteIndices = ( num_palette_indices_idc / 32) * 31 ) +
        (num_palette_indices_idc % 32) +
        MaxPaletteIndex+ 1.
```

The binarization using xWriteCoefRemainExGolomb process with cParam=2+indexMax/6 will be used to code the uiMappedValue. cParam can be any non-negative integer.

For binarization of the number of indices in a CU, either the (number of indices), (coded number of indices) or (number of indices−palette size) can be related to the block size. In one embodiment, all palette coded CU with different sizes use the same binarization table. In another embodiment, the binarization table can be determined by the block size. For example, if exponential Golomb code is used, the order parameter N can be determined based on the CU size. In particular, the 32×32 CU uses EG code with order 2; the 16×16 CU uses EG code with order 1; and the 8×8 CU uses EG code with order 0. In general, a block with a smaller block size has higher probability to include smaller values of palette indices.

In another embodiment, (number of copy_above modes), (number of copy_above modes−palette size), (number of copy_above modes−new palette size) or (number of copy_above modes−number of reused palette) can be signalled. The new palette size can be indicated by syntax element, num_signalled_palette_entries, and the number of reused palette may be indicated by syntax element, NumPredictedPaletteEntries. The binarization process disclosed in the "Coding (number of indices−1)" section and "Coding (number of indices−palette size)" section can be applied.

Restriction on Palette Size and Number of Indices

Syntax num_palette_indices_idc indicates number of palette indices signalled for the current block is always smaller than or equal to the current block size. In this case, the syntax description can be as following: num_palette_indices_idc is an indication of the number of palette indices signalled for the current block. In other words, num_palette_indices_idc shall be in the range of 0 to nCbS*nCbS−1 inclusive, where nCbS is the block width and length and (nCbS*nCbS) corresponds to block size. When num_palette_indices_idc is not present, it is inferred to be equal to 0.

In one example according to the present invention, if L rows or columns in a current CU are predicted from the neighbouring CU or other methods, the num_palette_indices_idc shall be in the range of 0 to nCbS*(nCbS−L)−1, inclusive.

In other embodiment, CurrentPaletteSize indicating the palette size of current block is always smaller or equal to current block size. In this case, the syntax description can be as following: num_signalled_palette_entries specifies the number of entries in the current palette that are explicitly signalled. When num_signalled_palette_entries is not present, it is inferred to be equal to 0. The variable CurrentPaletteSize specifies the size of the current palette and is derived as follows:

$$CurrentPaletteSize=NumPredictedPaletteEntries+num\_signalled\_palette\_entries \quad (3)$$

The value of CurrentPaletteSize shall be in the range of 0 to min(nCbS*nCbS, palette_max_size), inclusive, where variable palette_max_size a corresponding to maximum palette size and is also referred as MaxPaletteIndex.

For example, if L rows or columns of a palette mode CU are predicted from the neighbouring CU or other methods, the value of CurrentPaletteSize shall be in the range of 0 to min(nCbS*(nCbS−L), palette_max_size), inclusive.

In another embodiment, palette_max_size is smaller than or equal to the minimum of 32×32 or maximum CTU size defined. In this case, the syntax description can be as following: palette_max_size specifies the maximum allowed palette size. palette_max_size shall be in the range of 0 to min(32*32, 1<<(CtbLog2SizeY+1)) inclusive, where CtbLog2SizeY corresponds to the luma CTU size represented in log base 2. When not present, the value of palette_max_size is inferred to be 0.

In yet another embodiment, palette_escape_val_present_flag indicating the existence of escape values in the current block can be inferred as 0 when the current palette size is greater than or equal to current block size. In this case, the syntax description can be as following: palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1. When CurrentPaletteSize is greater than or equal to nCbS*nCbs, palette_escape_val_present_flag is inferred to be equal to 0.

In one example, if L rows or columns of a palette mode CU are predicted from the neighbouring CU or other methods and CurrentPaletteSize is greater than or equal to nCbS*(nCbs−L), palette_escape_val_present_flag is inferred to be equal to 0.

In yet another embodiment, the variable NumPaletteIndices specifies the number of palette indices signalled for the current block. The value of NumPaletteIndices should be constrained.

According to another embodiment, the value of NumPaletteIndices should be in the range of 1 to nCbS*nCbS. For example, the value of NumPaletteIndices should be in the range from 1 to PaletteCodedArea. The PaletteCodedArea can be nCbS*nCbS. For a palette mode CU, if L rows or columns are predicted from the neighbouring CU or other methods, the PaletteCodedArea can be nCbS*(nCbS−L).

A constraint should be imposed on num_palette_indices_idc. The value of num_palette_indices_idc should be in the range of 0 to PaletteCodedArea−1. In the case of the PaletteCodedArea equal to nCbS*nCbS, if L rows or columns of a palette mode CU are predicted from the neighbouring CU or other methods, the PaletteCodedArea can be nCbS*(nCbS−L).

Palette Entries

Another aspect of the present invention addresses coding of palette entries. In order to ensure all palette entries are used in the index map, restriction can be applied.

Syntax element palette_entry specifies the value of a component in a palette entry for the current palette. The variable PredictorPaletteEntries[cIdx][i] specifies the i-th element in the predictor palette for the colour component cIdx. In order to ensure that all palette entries are used in the index map, every entry of CurrentPaletteEntries shall be used at least once for palette idx. Furthermore, syntax element num_palette_indices_idc is an indication of the number of palette indices signalled for the current block. When num_palette_indices_idc is not present, it is inferred to be equal to 0.

The variable NumPaletteIndices specifies the number of palette indices signalled for the current block and NumPaletteIndices shall be larger than or equal to (MaxPaletteIndex+1). NumPaletteIndices can be derived according to Table 3.

cabac_init_flag and initType for IntraBC Slice

According to embodiment of the present invention, an IntaBC slice can be identified by several ways. For example, an IntaBC slice can be identified according to the following process:

TABLE 19

```
while( rIdx < NumRpsCurrTempList1 ) {
    for( i = 0; i < NumPocStCurrAfter && rIdx <
            NumRpsCurrTempList1; rIdx++, i++ )
        currPiconlyRef &= (slice_type==P_SLICE &&
            curr_pic_as_ref_enabled_flag && RefPicList0[
            rIdx ] == currPic);
}
```

In the above table, syntax element currPiconlyRef equal to 1 specifies that the current picture is the only reference picture, which implies the IntraBC mode being used. When a slice is IntraBC slice, the reference pictures are current picture. In this case, cabac_init_flag can be forced to be 0 with or without signalling it in SliceHeader.

Syntax element cabac_init_flag specifies the method for determining the initialization table used in the initialization process for context variables. When cabac_init_flag is not present it is inferred to be equal to 0. When currPiconlyRef is false, cabac_init_flag is set to be equal to 0.

In other embodiment, initType of the slice (IntraBC slice) can be set as 1 regardless of cabac_init_flag, where initType specifies the initialization type for context coding and the value of initType is from 0 to 2. An exemplary process is shown in the following Table.

TABLE 20

```
if( slice_type = = I )
    initType = 0
```

TABLE 20-continued

```
    else if (currPiconlyRef)
        initType = 1
    else if( slice_type = = P )
        initType = cabac_init_flag ? 2 : 1
    else
        initType = cabac_init_flag ? 1 : 2
```

In another embodiment, cabac_init_flag can be inferred as 1 without signalling it in Slice Header. An exemplary syntax table incorporating the embodiment is shown in the following table, where cabac_init_flag is included as indicated by Note (21-2) only if cabac_init_present_flag has a value of 1 and currPiconlyRef has a value of 0 as indicated by Note (21-1).

TABLE 21

| slice_segment_header( ) { | Note |
|---|---|
| ... | |
| if( slice_type = = P || slice_type = = B ) { | |
| ... | |
| if( cabac_init_present_flag && !currPiconlyRef ) | (21-1) |
| cabac_init_flag | (21-2) |
| ... | |
| } | |

In another embodiment, when syntax element cabac_init_flag is not present, it is inferred to be equal to 0. When currPiconlyRef is false, cabac_init_flag is inferred as 1.

In yet another embodiment, syntax element cabac_init_flag can be set to 1 with or without signalling it in SliceHeader. The text will be as following. In this case, when cabac_init_flag is not present it is inferred to be equal to 0. When currPiconlyRef is false, cabac_init_flag is set to 1.

In other embodiment, initType of the slice (IntraBC slice) can be set as 2 regardless of cabac_init_flag. An exemplary process is shown in the following Table.

TABLE 22

```
    if( slice_type = = I )
        initType = 0
    else if (currPiconlyRef )
        initType = 2
    else if( slice_type = = P )
        initType = cabac_init_flag ? 2 : 1
    else
        initType = cabac_init_flag ? 1 : 2
```

In another embodiment, cabac_init_flag can have value of 0, 1 or 2. Syntax element cabac_init_flag with a value of 2 indicates initType for current slice is 0 (i.e., I_SLICE). An exemplary process is shown in the following Table.

TABLE 23

```
if( slice_type = = I )
    initType = 0
else if( slice_type = = P )
    initType = cabac_init_flag==1 ? 2 : (cabac_init_flag==0 ? 1 : 0)
else
    initType = cabac_init_flag ? 1 : 2
```

In another variation, this feature mentioned above can be applied only when the slice is IntraBC slice as following:

TABLE 24

```
if( slice_type = = I )
    initType = 0
else if (currPiconlyRef)
    initType = cabac_init_flag==1 ? 2 : (cabac_init_flag==0 ? 1 : 0)
else if( slice_type = = P )
    initType = cabac_init_flag ? 2 : 1
else
    initType = cabac_init_flag ? 1 : 2
```

Signalling cabac_init_flag having a value range from 0 to 2 is shown in the following exemplary syntax table, where the text enclosed by an asterisk pair within a bracket pair (i.e., [*deleted text*]) indicates deletion:

TABLE 25

```
slice_segment_header( ) {
    ...
    if( slice_type = = P || slice_type = = B ) {
        ...
        if( cabac_init_present_flag)
            cabac_init_flag_pb [*cabac_init_flag*]
        if( cabac_init_present_flag && !cabac_init_flag_pb &&
        currPiconlyRef )
            cabac_init_flag_i
    ...
}
```

In the above syntax table, cabac_init_flag_pb specifies the method for determining the initialization table for the P-slice and B-slice used in the initialization process for context variables. When cabac_init_flag_pb is not present it is inferred to be equal to 0. Syntax element cabac_init_flag_i specifies the method for determining the initialization table for the I-slice used in the initialization process for context variables. When cabac_init_flag_i is not present it is inferred to be equal to 0. The syntax element cabac_init_flag can be derived according to:

$$cabac\_init\_flag = cabac\_init\_flag\_i << 1 + cabac\_init\_flag\_pb$$

Also an individual flag for each slice type can be signalled to indicate that current slice uses initType 0 in SliceHeader. An exemplary syntax table is shown below.

TABLE 26

```
slice_segment_header( ) {
    ...
    cabac_init_0_flag
        if( slice_type = = P || slice_type = = B ) {
            ...
            if( cabac_init_present_flag)
                cabac_init_flag
        ...
    }
```

The associated initType process is shown in the following table.

TABLE 27

```
If(cabac_init_0_flag)
    initType = 0
if( slice_type = = I )
    initType = 0
else if( slice_type = = P )
    initType = cabac_init_flag ? 2 : 1
else
    initType = cabac_init_flag ? 1 : 2
```

Conformance Constraint of Palette_Predictor_Run and Palette Reuse Flags

In JCTVC-T1005, the parsing and decoding process for palette_predictor_run and palette reuse flags is shown in the following syntax table.

TABLE 28

| palette_coding( x0, y0, nCbS ) { | Note |
|---|---|
| palettePredictionFinished = 0 | |
| NumPredictedPaletteEntries = 0 | |
| for( i = 0; i < PredictorPaletteSize && | |
| !palettePredictionFinished && NumPredictedPaletteEntries < | |
| palette_max_size; | |
| i++ ) { | |
| palette_predictor_run | |
| if( palette_predictor_run != 1 ) { | |
| if( palette_predictor_run > 1 ) | |
| i += palette_predictor_run − 1 | |
| PalettePredictorEntryReuseFlag[ i ] = 1 | |
| NumPredictedPaletteEntries++ | |
| } else | |
| palettePredictionFinished = 1 | |
| } | |
| .... | |

When syntax element palette_predictor_run (coded using Exponential Golomb order 0, EG-0) is parsed, the corresponding position i is derived to set the reuse flag to 1. The corresponding entry in the palette predictor will be used for the current CU.

However, it is possible for an encoder to generate palette_predictor_run having an invalid value for i that is beyond the size of PalettePredictorEntryReuseFlag[ ]. The size of the PalettePredictorEntryReuseFlag[ ] is the same as the size of palette predictor. For example, if palette predictor size is 17, current position of i is 14, and coded/parsed palette_predictor_run is 10, then i+=10−1 becomes 23, which is over the size of palette predictor. In order to overcome this issue, embodiments of the present invention are disclosed to prevent from accessing beyond the array size and to prevent from increasing the value NumPredictedPaletteEntries in such cases.

Embodiment 1: Conformance Constraint

According to this embodiment, a constraint is imposed on the bitstream to ensure the bitstream is always a conforming bitstream. Therefore, for a conforming bitstream, variable i will always point to a valid position of palette_predictor_run.

For example, conformace constraints can be imposed on the parsed syntax palette_predictor_run:

(palette_predictor_run−1)<PredictorPaletteSize−$i$,
where $i$ is the current position before parsing the current palette_predictor_run.

In another example, conformace constraints can be imposed on the position after adding the parsed syntax palette_predictor_run:

$i$+(palette_predictor_run−1)<PredictorPaletteSize,
where $i$ is the current position before parsing the current palette_predictor_run.

According to this embodiment, (i+=palette_predictor_run−1) should be smaller than PredictorPaletteSize.

Figure 3:
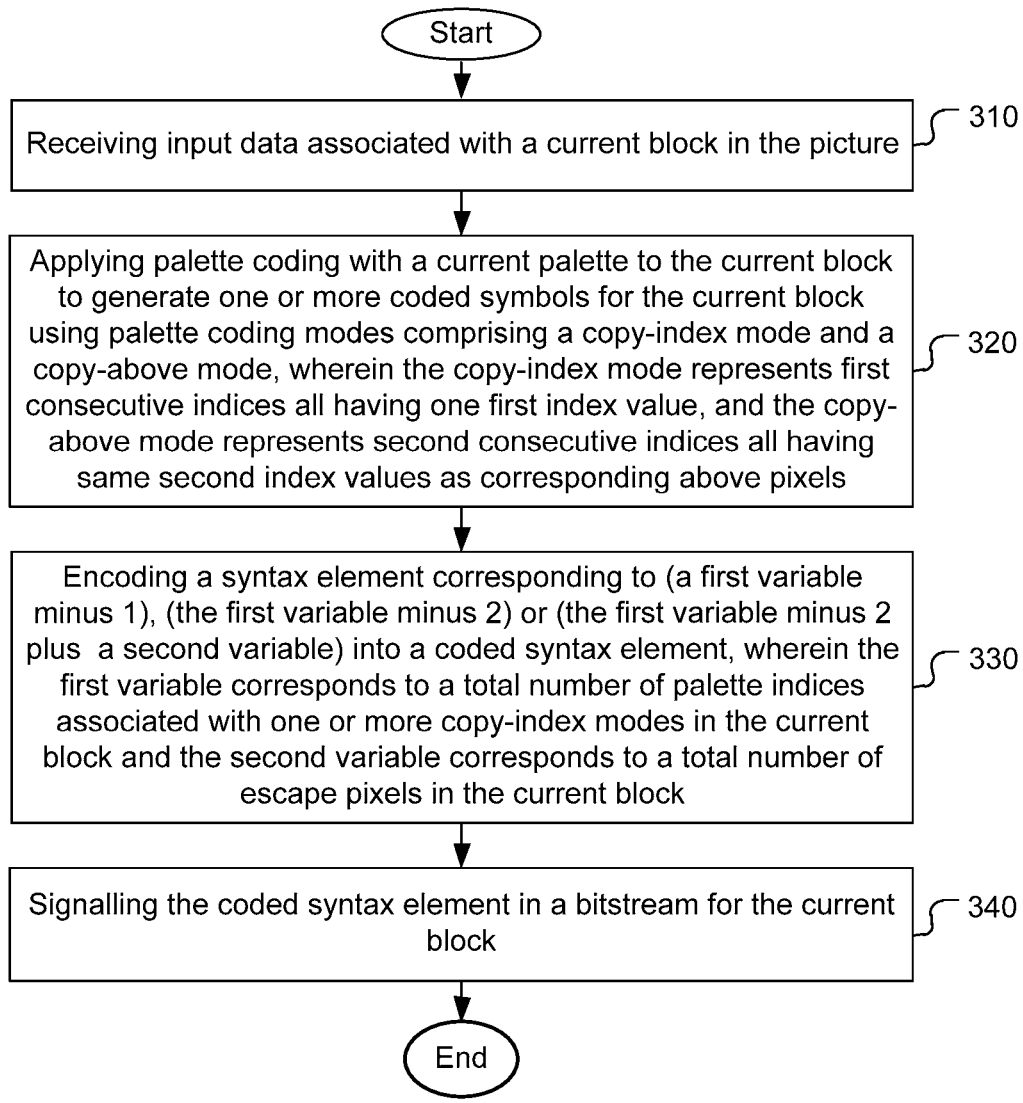
FIG. 3 illustrates an exemplary flowchart of palette coding according to an embodiment of the present invention, where a syntax element corresponding to (a total number of palette indices associated with one or more copy-index modes in the current block minus one) is signalled.

FIG. 3 illustrates an exemplary flowchart of palette coding according to an embodiment of the present invention, where a syntax element corresponding to (a total number of palette indices associated with one or more copy-index modes in the current block minus one) is signalled. The system receives input data associated with a current block in the picture in step 310. Palette coding with a current palette is then applied to the current block to generate one or more coded symbols for the current block using palette coding modes comprising a copy-index mode and a copy-above mode in step 320, where the copy-index mode represents first consecutive indices all having one first index value, and the copy-above mode represents second consecutive indices all having same second index values as corresponding above pixels. A syntax element corresponding to (a first variable minus 1), (the first variable minus 2) or (the first variable minus 2 plus a second variable) is encoded into a coded syntax element in step 330, wherein the first variable corresponds to a total number of palette indices associated with one or more copy-index modes in the current block and the second variable corresponds to a total number of escape pixels in the current block. The coded syntax element is then signalled in a bitstream for the current block in step 340.

The decoder flowchart corresponding to the encoder in FIG. 3 can be derived using an inverse process of the flowchart in FIG. 3.

Figure 4:
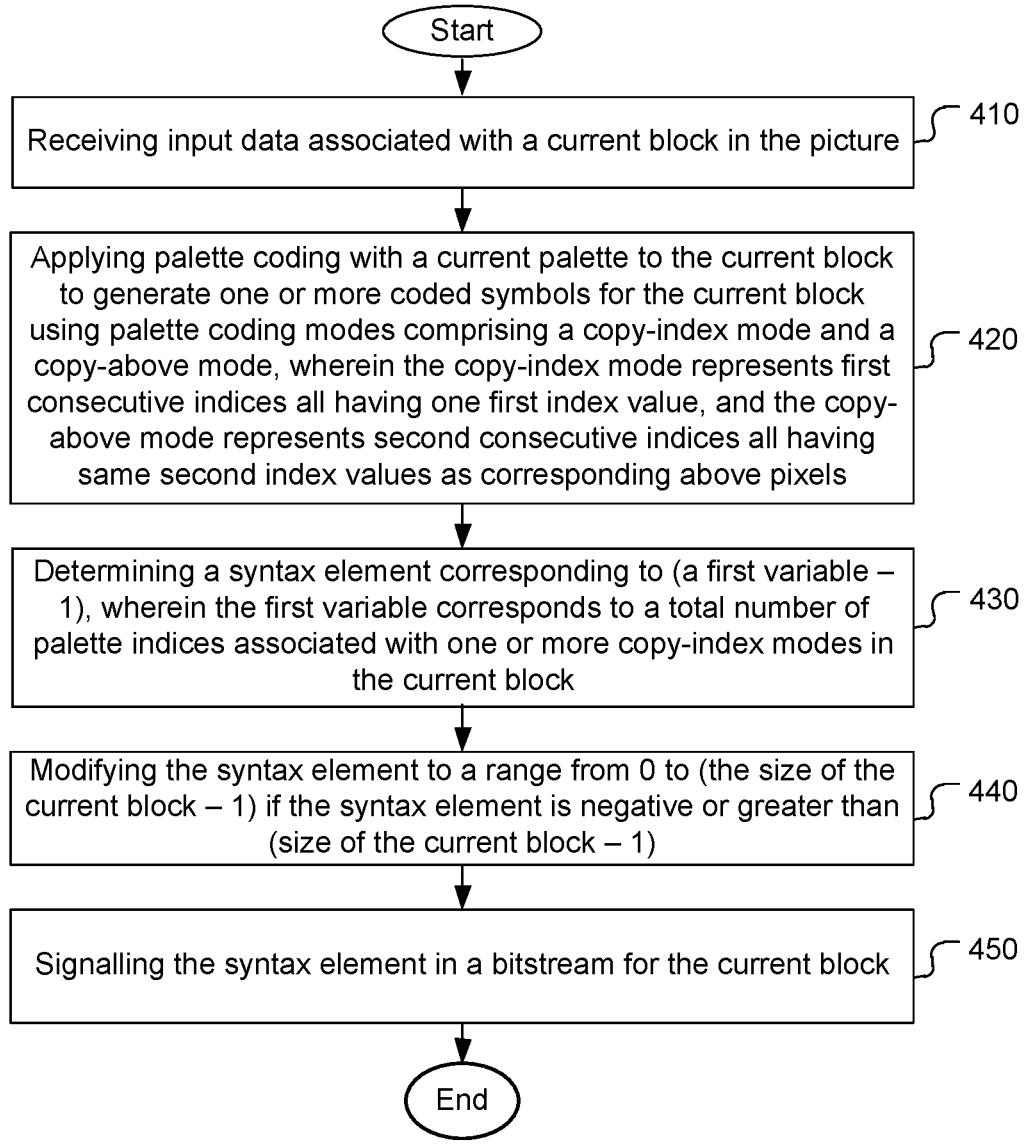
FIG. 4 illustrates an exemplary flowchart of palette coding according to an embodiment of the present invention, where a constraint is imposed on the syntax element corresponding to the total number of palette indices associated with one or more copy-index modes in the current block minus one.

FIG. 4 illustrates an exemplary flowchart of palette coding according to an embodiment of the present invention, where a constraint is imposed on the syntax element corresponding to a total number of palette indices associated with one or more copy-index modes in the current block minus one. The system receives input data associated with a current block in the picture in step 410. Palette coding with a current palette is then applied to the current block to generate one or more coded symbols for the current block using palette coding modes comprising a copy-index mode and a copy-above mode in step 420, where the copy-index mode represents first consecutive indices all having one first index value, and the copy-above mode represents second consecutive indices all having same second index values as corresponding above pixels. A syntax element corresponding to (a first variable−1) is determined ibn step 430, where the first variable corresponds to a total number of palette indices associated with one or more copy-index modes in the current block. If the syntax element is negative or greater than (size of the current block−1), the syntax element is modified to a range from 0 to (the size of the current block−1) in step 440. The syntax element is then signalled in a bitstream for the current block in step 450.

Figure 5:
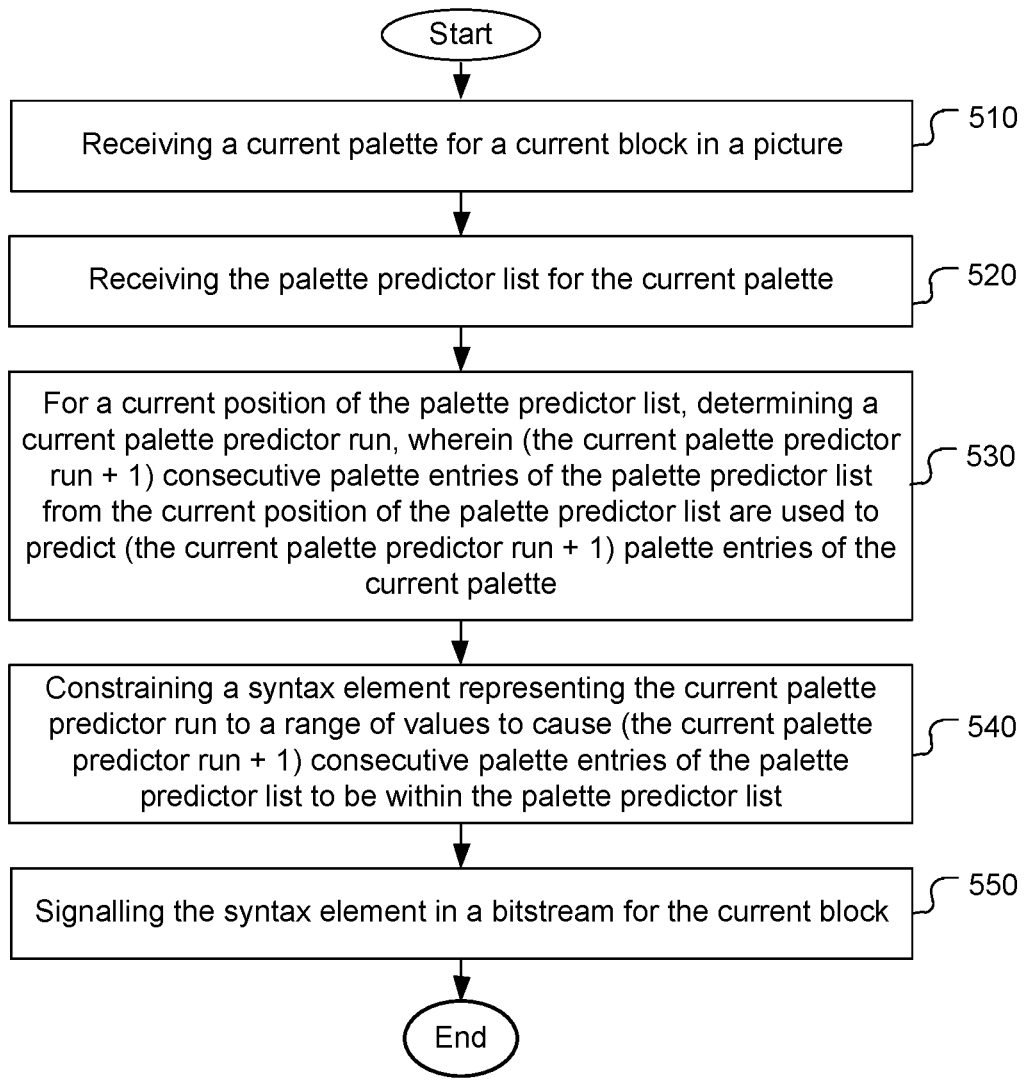
FIG. 5 illustrates an exemplary flowchart of palette coding according to an embodiment of the present invention, where a conformance constraint is imposed on the syntax element corresponding to palette predictor run.

FIG. 5 illustrates an exemplary flowchart of palette coding according to an embodiment of the present invention, where a conformance constraint is imposed on the syntax element corresponding to palette predictor run. The system receives a current palette for a current block in a picture in step 510. The system also receives the palette predictor list for the current palette in step 520. For a current position of the palette predictor list, determining a current palette predictor run, wherein (the current palette predictor run+1) consecutive palette entries of the palette predictor list from the current position of the palette predictor list are used to predict (the current palette predictor run+1) palette entries of the current palette in step 530. The syntax element is constrained to a range of values to cause (the current palette predictor run+1) consecutive palette entries of the palette predictor list to be within the palette predictor list in step 540, where (the current palette predictor run+1) consecutive palette entries of the palette predictor list are located according to position information including the syntax element. In step 550, the syntax element is signalled in a bitstream for the current block.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette index map decoding for blocks in a picture, wherein an index map of a current block is coded with a current palette using palette coding modes comprising a copy-index mode and a copy-above mode, and wherein each copy-index mode represents first consecutive indices all having one first index value, and each copy-above mode represents second consecutive indices all having same second index values as corresponding above pixels, comprising:
   receiving input bitstream associated with a current block in the picture;
   parsing a coded syntax element corresponding to (a first variable minus 1), (the first variable minus 2) or (the first variable minus 2 plus a second variable) from the input bitstream, wherein the first variable corresponds to a total number of palette indices associated with one or more copy-index modes in the current block and the second variable corresponds to a total number of escape pixels in the current block;
   decoding the coded syntax element into a syntax element; and
   applying palette decoding to the current block according to the syntax element.

2. The method of claim 1, wherein the coded syntax element corresponds to (a first variable minus 1) and said decoding the coded syntax element comprises decoding the coded syntax element using N-th order exponential Golomb (EG) code and N is a non-negative integer.

3. The method of claim 2, wherein N belongs to a first range from 0 to 6 or a second range from 0 to 10 depending on a size of the current block.

4. The method of claim 2, wherein N is equal to 0 and binarized strings are "1", "01x", "001xx" and "0001xx" for syntax element values {0}, {1 to 2}, {3 to 6} and {7 to 14} respectively, and wherein "x" corresponds to "0" or "1".

5. The method of claim 1, wherein the coded syntax element corresponds to (a first variable minus 1) and said decoding the coded syntax element further comprising applying entropy decoding using one or more contexts to one or more bins of each binarized string of the coded syntax element.

6. The method of claim 5, wherein three contexts are used for said entropy decoding the coded syntax element, and wherein first bin for value {0}, first 2 bins for values {1 to 2}, and first 3 bins for values {3 to 6} are entropy coded according to said one or more contexts.

7. The method of claim 1, wherein the coded syntax element corresponds to (a first variable minus 1) and said decoding the coded syntax element comprises decoding the coded syntax element using truncated Rice code with a Rice parameter to generate a prefix part, and wherein the Rice parameter is equal to (2+indexMax/6) and indexMax corresponds to a total number of entries in a palette of the current block.

8. A method of palette index map coding for blocks in a picture, comprising:
   receiving input data associated with a current block in the picture;
   applying palette coding with a current palette to the current block to generate one or more coded symbols for the current block using palette coding modes comprising a copy-index mode and a copy-above mode, wherein the copy-index mode represents first consecutive indices all having one first index value, and the copy-above mode represents second consecutive indices all having same second index values as corresponding above pixels;
   encoding a syntax element corresponding to (a first variable minus 1), (the first variable minus 2) or (the first variable minus 2 plus a second variable) into coded syntax element, wherein the first variable corresponds to a total number of palette indices associated with one or more copy-index modes in the current block and the second variable corresponds to a total number of escape pixels in the current block; and
   signalling the coded syntax element in a bitstream for the current block.

9. The method of claim 8, wherein the syntax element corresponds to (a first variable minus 1) and said encoding the syntax element comprises binarizing the syntax element using N-th order exponential Golomb (EG) code and N is a non-negative integer.

10. The method of claim 9, wherein N belongs to a first range from 0 to 6 or a second range from 0 to 10 depending on a size of the current block.

11. The method of claim 9, wherein N is equal to 0 and binarized strings are "1", "01x", "001xx" and "0001xx" for syntax element values {0}, {1 to 2}, {3 to 6} and {7 to 14} respectively, and wherein "x" corresponds to "0" or "1".

12. The method of claim 11, wherein said encoding the syntax element further comprising applying entropy coding using one or more contexts to one or more bins of each binarized string.

13. The method of claim 12, wherein three contexts are used for entropy coding of the syntax element, and wherein first bin for syntax element value {0}, first 2 bins for syntax element values {1 to 2}, and first 3 bins for syntax element values {3 to 6} are entropy coded according to said one or more contexts.

14. The method of claim 8, wherein the syntax element corresponds to (a first variable minus 1) and said encoding the syntax element comprises binarizing the syntax element using truncated Rice code with a Rice parameter to generate a prefix part, and wherein the Rice parameter is equal to (2+indexMax/6) and indexMax corresponds to a total number of entries in a palette of the current block.

15. The method of claim 8, wherein the syntax element corresponds to (a first variable minus 1), the method further comprising determining whether the syntax element is negative or greater than (size of the current block−1), and modifying the syntax element to a range from 0 to (the size of the current block−1) if the syntax element is negative or greater than (size of the current block−1).

16. A method of palette index map coding for blocks in a picture, comprising:
receiving input data associated with a current block in the picture;
applying palette coding with a current palette to the current block to generate one or more coded symbols for the current block using palette coding modes comprising a copy-index mode and a copy-above mode, wherein the copy-index mode represents first consecutive indices all having one first index value, and the copy-above mode represents second consecutive indices all having same second index values as corresponding above pixels;
determining a syntax element corresponding to (a first variable−1), wherein the first variable corresponds to a total number of palette indices associated with one or more copy-index modes in the current block;
if the syntax element is negative or greater than (size of the current block−1), modifying the syntax element to a range from 0 to (the size of the current block−1); and
signalling the syntax element in a bitstream for the current block.

17. A method of coding a palette table using a palette predictor list, comprising:
receiving input data associated with a current block in a picture;
receiving a current palette for a current block in the picture;
receiving the palette predictor list for the current palette;
for a current position of the palette predictor list, determining a current palette predictor run, wherein (the current palette predictor run+1) consecutive palette entries of the palette predictor list from the current position of the palette predictor list are used to predict (the current palette predictor run+1) palette entries of the current palette;
constraining a syntax element representing the current palette predictor run to a range of values to cause (the current palette predictor run+1) consecutive palette entries of the palette predictor list to be within the palette predictor list; and
signalling the syntax element in a bitstream for the current block.

18. The method of claim 17, wherein said constraining the syntax element to the range of values corresponds to restricting (the current position of the palette predictor list+the syntax element−1) to be smaller than size of the palette predictor list.

19. The method of claim 17, wherein said constraining the syntax element to the range of values corresponds to restricting (the syntax element−1) to be smaller than (size of the palette predictor list−the current position of the palette predictor list).

20. The method of claim 17, wherein said constraining the syntax element to the range of values corresponds to restricting the syntax element to be smaller than (size of the palette predictor list−the current position of the palette predictor list−1).

* * * * *